United States Patent
Sakaue et al.

(10) Patent No.: US 7,597,982 B2
(45) Date of Patent: Oct. 6, 2009

(54) FUEL CELL SYSTEM WITH A GAS SUPPLY PUMP THAT APPLIES NEGATIVE PRESSURE TO THE ANODE AND CATHODE

(75) Inventors: Eiichi Sakaue, Tokyo (JP); Yuusuke Sato, Tokyo (JP); Nobutaka Kikuiri, Koganei (JP); Atsushi Sadamoto, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 557 days.

(21) Appl. No.: 10/668,161

(22) Filed: Sep. 24, 2003

(65) Prior Publication Data

US 2004/0062960 A1 Apr. 1, 2004

(30) Foreign Application Priority Data

Sep. 30, 2002 (JP) ............... 2002-288071

(51) Int. Cl.
*H01M 8/04* (2006.01)
(52) U.S. Cl. ............... 429/34; 429/17; 429/12
(58) Field of Classification Search ............... 429/17, 429/34
See application file for complete search history.

(56) References Cited

U.S. PATENT DOCUMENTS 6,303,244 B1 10/2001 Surampudi et al.
6,844,094 B2 * 1/2005 Kobayashi et al. ............ 429/25

FOREIGN PATENT DOCUMENTS

| JP | 2001-006717 | 1/2001 |
| JP | 2001-185181 | 7/2001 |
| JP | 2001-351654 | 12/2001 |

OTHER PUBLICATIONS

U.S. Appl. No. 10/668,161, filed Sep. 24, 2003, Sakaue et al.
U.S. Appl. No. 10/811,846, filed Mar. 30, 2004, Sato et al.
U.S. Appl. No. 10/776,289, filed Feb. 12, 2004, Hisano et al.
U.S. Appl. No. 10/668,215, filed Sep. 24, 2003, Sadamoto et al.

* cited by examiner

*Primary Examiner*—Mark Ruthkosky
(74) *Attorney, Agent, or Firm*—Oblon, Spivak, McClelland, Maier & Neustadt, P.C.

(57) ABSTRACT

A fuel cell system is provided with a fuel cell having an anode, a cathode and an electrolyte film put therebetween, a fuel supply unit supplying fuel to the anode and a gas supply unit having a pump, the pump giving negative pressure to the cathode so as to introduce gas containing oxidant to the cathode.

4 Claims, 7 Drawing Sheets

FUEL CELL SYSTEM WITH A GAS SUPPLY PUMP THAT APPLIES NEGATIVE PRESSURE TO THE ANODE AND CATHODE

CROSS-REFERENCE TO RELATED APPLICATIONS

This application is based upon and claims the benefit of priority from the prior Japanese Patent Application No. 2002-288071(filed Sep. 30, 2002); the entire contents of which are incorporated herein by reference.

BACKGROUND OF THE INVENTION

1. Field of the Invention

The present invention relates to a fuel cell system, more specifically, relates to a fuel cell system preventing leakage of inner liquid and reducing the number of pumps so as to be compactly constituted.

2. Description of the Related Art

In general, a fuel cell is provided with an anode 3, a cathode 5 and an electrolyte film 7 put therebetween as shown in FIG. 1, in which a direct methanol fuel cell is exemplified. FIG. 2 shows an example of a fuel cell system considered to be a general constitution thereof. Fuel (methanol in this case) is supplied to the anode 3 by mean of a pump 11 and gas (generally air) which contains oxidant (generally oxygen) is supplied to the cathode 5 by means of a pump 13. At the anode 3 and the cathode 5, following reactions respectively progress.

At the anode 3;

   (1)

At the cathode 5;

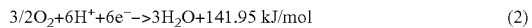   (2)

If the protons and the electrons are freely transported between the anode 3 and the cathode 5, net reaction as described below is completed in the fuel cell. Thereby an electric power generation can not be achieved.

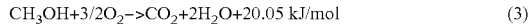   (3)

However, the electrolyte film 7 has a cation selectivity so that cations (protons in this case) are selectively transported therethrough in preference to anions (electrons in this case). Therefore the electrons are extracted from the fuel cell so that the electric power generation is made possible as shown in FIG. 1. In the course of the power generation, carbon dioxide is generated at the anode 3 and water is generated at the cathode 5.

To develop the cation selectivity, it is necessary to humidify the electrolyte film 7 with water. It is proposed that the water is admixed to the methanol in advance so as to be supplied to the electrolyte film 7.

It is known that the methanol partly percolates the electrolyte film 7 from the anode 3 to the cathode 5 and such methanol is called "crossover methanol". The crossover methanol reacts with water according to the reaction equation (1) at the cathode 5 and causes a counter electromotive force so that the power generation of the fuel cell is suppressed.

A related art is disclosed in Japanese Patent Application Laid-open No. 2002-110199. In the fuel cell system of the related art, the reaction products in the anode and/or the cathode are recycled.

SUMMARY OF THE INVENTION

As understood from the reaction equation (2), water is continuously generated in the cathode. The water tends to be condensed in an exhaust flow path and the condensed water tends to plug the exhaust flow path. In a case where the exhaust flow path is plugged, internal pressure is increased so that a concern about any unexpected troubles is raised. For example, the water might leak out of flow paths or the battery reaction itself might be adversely affected.

The present invention has been achieved in view of the above problems and is intended for provision of a fuel cell system preventing leakage of inner liquid.

According to a first aspect of the invention, a fuel cell system is provided with a fuel cell having an anode, a cathode and an electrolyte film put therebetween, a fuel supply unit supplying fuel to the anode and a gas supply unit having a pump, the pump giving negative pressure to the cathode so as to introduce gas containing oxidant to the cathode.

According to a second aspect of the invention, a fuel cell system is provided with a fuel cell having an anode, a cathode and an electrolyte film put therebetween, a fuel supply unit supplying fuel to the anode, a gas supply unit having a pump introducing gas containing oxidant to the cathode and an exhaust flow path communicating the cathode and the fuel supply unit so that the pump gives positive pressure to the fuel supply unit through the exhaust flow path.

According to a third aspect of the present invention, a fuel cell system is provided with a fuel cell having an anode, a cathode and an electrolyte film put therebetween, a fuel supply unit supplying fuel to the anode, a gas supply unit introducing gas containing oxidant to the cathode, an exhaust flow path from the anode, the cathode, or the anode and the cathode, a first switching valve openable and closable of the exhaust flow path and a power switch switching power supply of the fuel cell wherein the first switching valve is switched along with the power switch.

According to a fourth aspect of the present invention, a fuel cell having an anode, a cathode and an electrolyte film put therebetween, a fuel supply unit supplying fuel to the anode, a gas supply unit introducing gas containing oxidant to the cathode, a second switching valve openable and closable of the fuel supply unit and a power switch switching power supply of the fuel cell wherein the second switching valve is switched along with the power switch.

According to a fifth aspect of the present invention, a fuel cell having an anode, a cathode and an electrolyte film put therebetween, a fuel supply unit supplying fuel to the anode, a gas supply unit introducing gas containing oxidant to the cathode, an exhaust flow path from the anode, the cathode, or the anode and the cathode, a first switching valve openable and closable of the exhaust flow path, a second switching valve openable and closable of the fuel supply unit; and a power switch switching power supply of the fuel cell wherein at least one of the first switching valve and the second switching valve is switched along with the power switch.

DETAILED DESCRIPTION OF THE INVENTION

Figure 1:
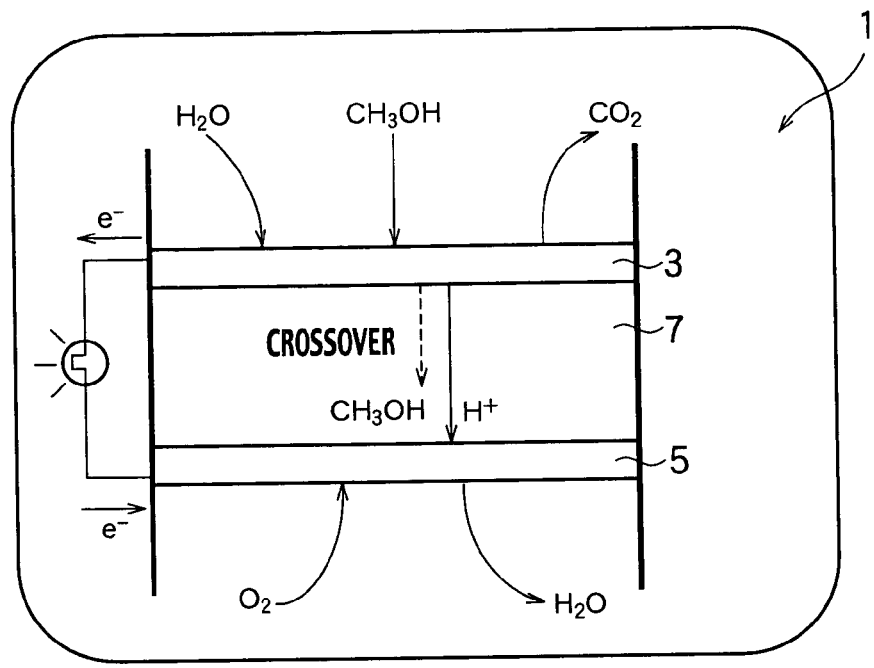
FIG. 1 is a schematic drawing of a direct methanol fuel cell according to a prior art.
Figure 2:
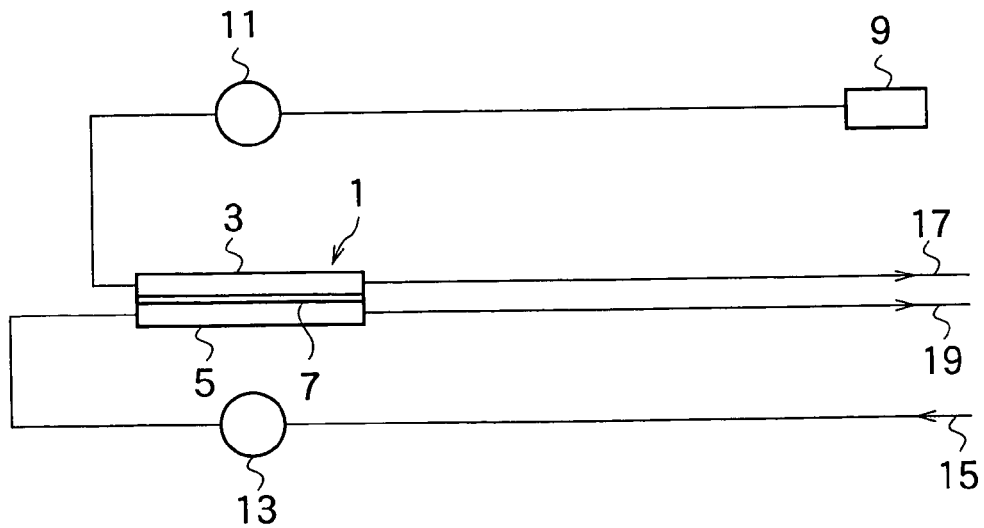
FIG. 2 is a schematic drawing of a fuel cell system according to a prior art.
Figure 3:
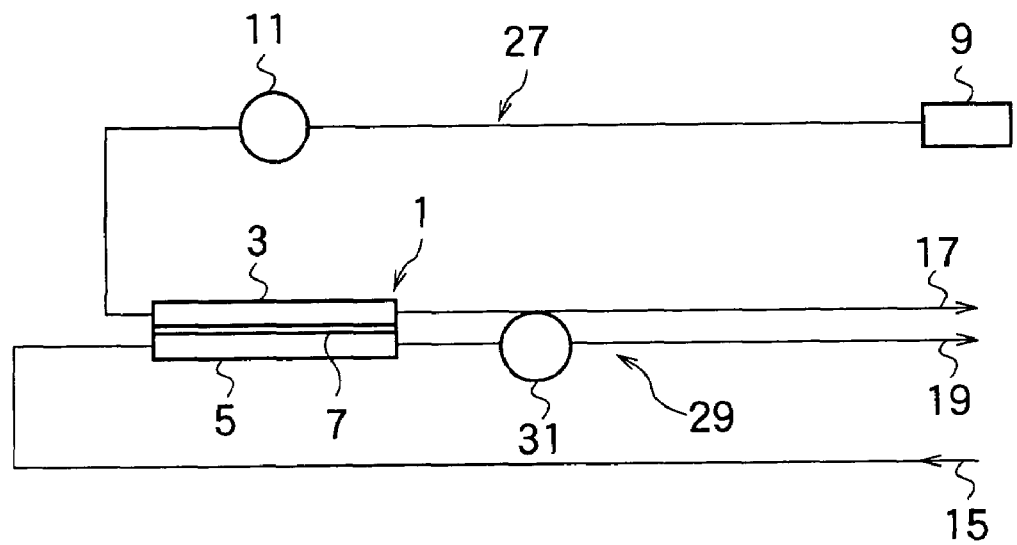
FIG. 3 is a schematic drawing of a fuel cell system according to a first embodiment of the present invention.

A first embodiment of the present invention will be described hereinafter with reference to FIG. 3.

A fuel cell system according to the first embodiment is provided with a fuel cell 1 which is provided with an anode 3, a cathode 5 and an electrolyte film 7 put therebetween. The fuel cell system is further provided with a fuel supply unit 27 connected to the anode 3 and a gas supply unit 29 connected to the cathode 5. The fuel supply unit 27 supplies fuel to the anode 3 and the gas supply unit 29 supplies gas containing oxidant to the cathode 5. A variety of substances can be applied to the gas, however, air introduced from an outside is preferable.

The fuel supply unit 27 is composed of a tank 9 pooling methanol aqueous solution as the fuel and a pump 11 for delivering the fuel to the anode 3.

The gas supply unit 29 is composed of an air inflow path 15 connected to an inlet of the cathode 5 and a pump 31 connected to an outlet of the cathode 5.

The pump 31 gives negative pressure to the cathode 5 so as to introduce the gas containing the oxidant from an air inflow path 15 to the cathode 5. The negative pressure further serves as a prevention of leakage of water and the other reaction products continuously generated in the cathode 5 in a case where the water is condensed and plugs the exhaust flow path 19.

Though, in the above description, the pump unit is provided with only the pump 31, another pump may be further on the air inflow path 15.

Figure 4:
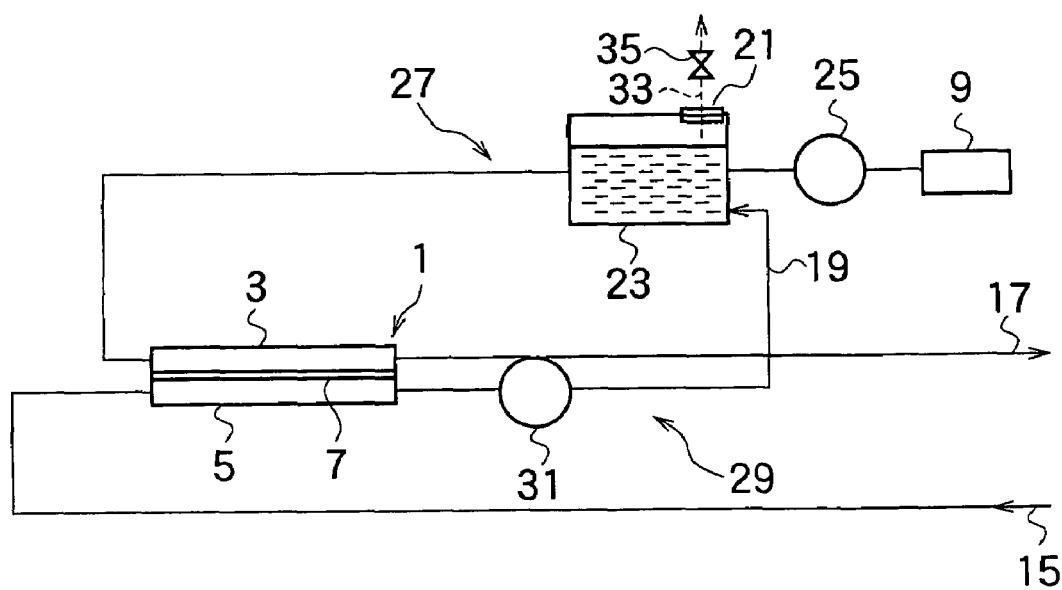
FIG. 4 is a schematic drawing of a fuel cell system according to a second embodiment of the present invention.

A second embodiment of the present invention will be described hereinafter with reference to FIG. 4. In the following description, the same elements as the above first embodiment are referenced with the same numerals and the detailed descriptions are omitted. Mainly differences are described below.

A fuel supply unit of the present embodiment is provided with a tank 9, a pump 25 and a mixing buffer tank 23. The exhaust flow path 19 is connected to the mixing buffer tank 23. The water generated in the cathode 5 is delivered with an exhaust gas from the cathode 5 to the mixing buffer tank 23. The mixing buffer tank 23 is provided with a gas-liquid separation membrane 21, a regulating valve 35 and an exhaust vent 33 which communicates with an outside. The water is separated from the exhaust gas by means of the gas-liquid separation membrane 21 so as to be admixed with liquid pooled in the mixing buffer tank 23.

Instead of the methanol aqueous solution, concentrated methanol is pooled in the tank 9 and is delivered to the mixing buffer tank 23 by mean of the pump 25. The concentrated methanol is admixed with the water delivered from the cathode 5 in the mixing buffer tank 23 so as to be appropriate concentration.

The pump 31 gives negative pressure to the cathode 5 so as to introduce the gas containing the oxidant thereto and, as well, gives positive pressure to the mixing buffer tank 23 so as to deliver the mixture of the methanol and the water as the fuel to the anode 3. Thereby a pump correspond to the pump 11 of the first embodiment can be omitted so that the fuel cell system can be simply and compactly constituted.

Furthermore, the internal pressure in the mixing buffer tank 23 can be controlled by means of widening or narrowing the regulating valve 35. Thereby the regulating valve 35 allows control of pressure and flow rate of the fuel supplied to the anode 3.

Figure 5:
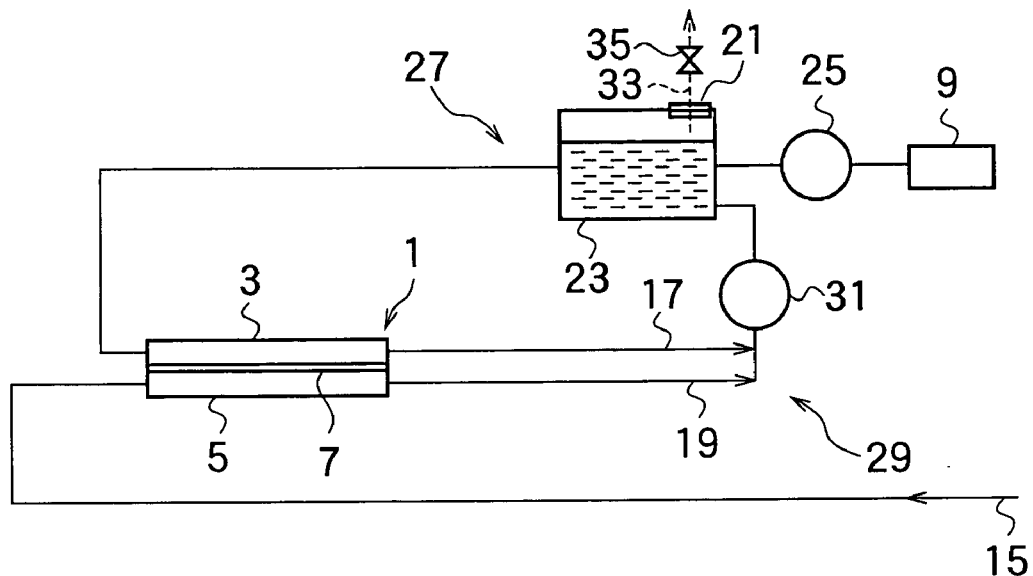
FIG. 5 is a schematic drawing of a fuel cell system according to a third embodiment of the present invention.

A third embodiment of the present invention will be described hereinafter with reference to FIG. 5. In the following description, the same elements as any of the above first and second embodiments are referenced with the same numerals and the detailed descriptions are omitted. Mainly differences are described below.

The constitution of the fuel cell system according to the present embodiment is similar to the above second embodiment, however, the exhaust flow path 17 is merged with the exhaust flow path 19. The exhaust flow paths 17 and 19 are connected to the mixing buffer tank 23 via the pump 31.

The pump 31 is a pump unit giving negative pressure to both the anode 3 and the cathode 5. The negative pressure induces the fuel into the anode 3 and the gas containing the oxidant into the cathode 5 and prevents liquid leakage from the anode 3 and the cathode 5. The pump 31 further gives positive pressure to the mixing buffer tank 23 so as to induce the fuel into the anode 3. More specifically, the fuel is induced by means of both the negative pressure in the anode 3 and the positive pressure in the mixing buffer tank 23.

Furthermore, because exhaust gas from both the anode 3 and the cathode 5 is conducted to the mixing buffer tank 23, both unreacted methanol and generated water contained in the exhaust gas are recycled.

According to the present embodiment, methanol recycling can be effectively achieved as well as the same effects as the above embodiments. Furthermore, fuel delivery comes to be steadier.

Figure 6:
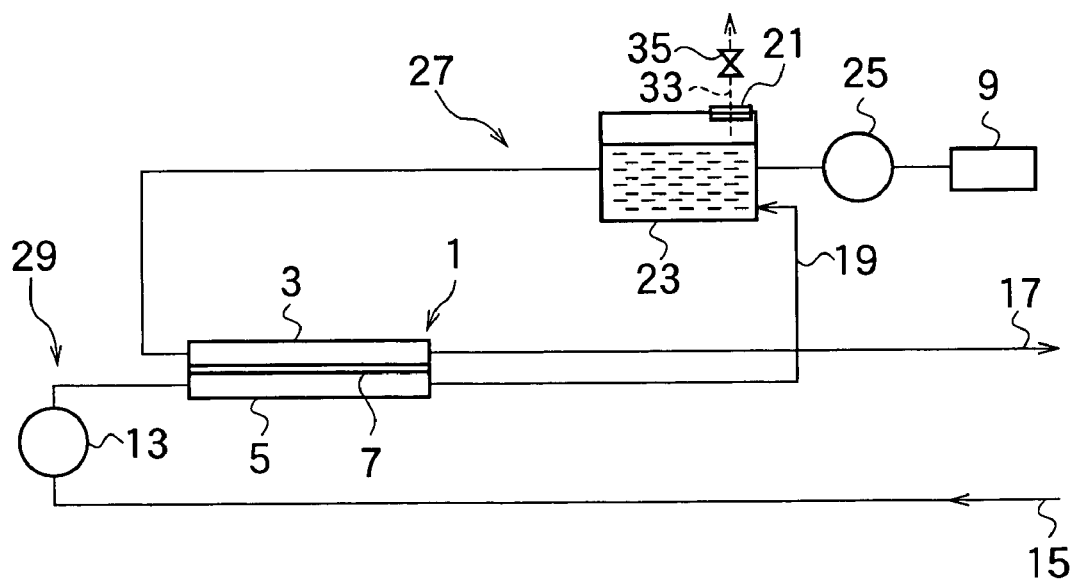
FIG. 6 is a schematic drawing of a fuel cell system according to a fourth embodiment of the present invention.

A fourth embodiment of the present invention will be described hereinafter with reference to FIG. 6. In the following description, the same elements as any of the above first to third embodiments are referenced with the same numerals and the detailed descriptions are omitted. Mainly differences are described below.

The constitution of the fuel cell system according to the present embodiment is similar to the above second embodiment, however, a pump 13 is provided on the air inflow path 15 instead of the pump 31 on the exhaust flow path 19.

Because the exhaust gas from the cathode 5 is conducted to the mixing buffer tank 23 and the pump 13 gives positive pressure thereto, water generated in the cathode 5 and contained in the exhaust gas is recycled and the fuel is delivered by means of the positive pressure as in the case with the second embodiment.

Figure 7:
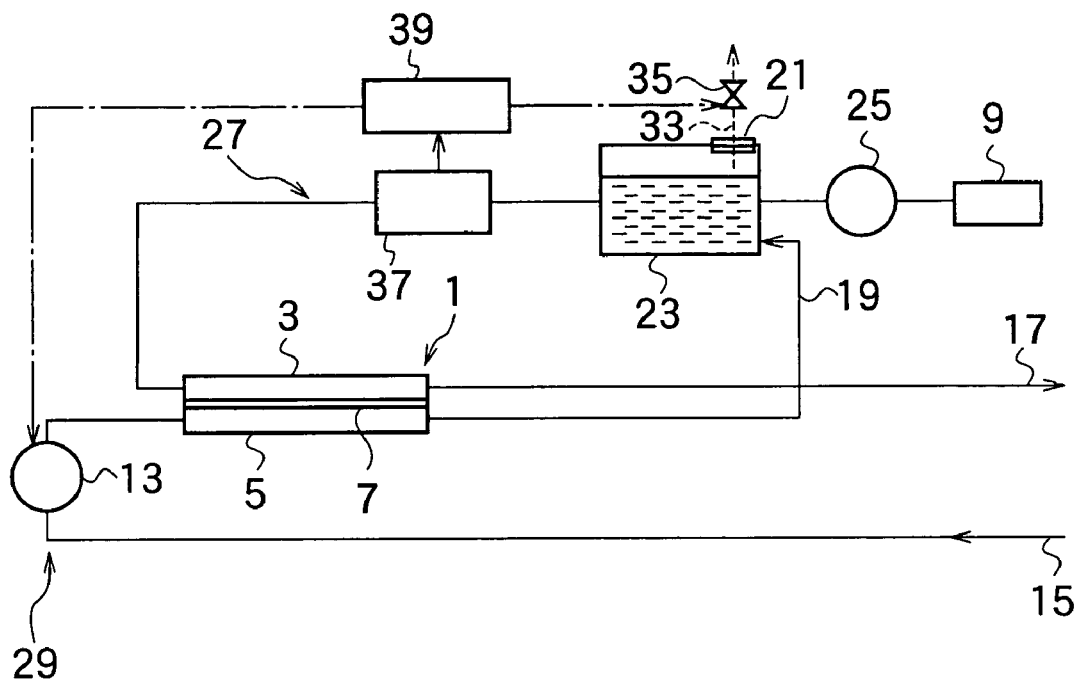
FIG. 7 is a schematic drawing of a fuel cell system according to a fifth embodiment of the present invention.

A fifth embodiment of the present invention will be described hereinafter with reference to FIG. 7. In the following description, the same elements as any of the above first to fourth embodiments are referenced with the same numerals and the detailed descriptions are omitted. Mainly differences are described below.

The fuel cell system of the present embodiment includes the constitution of the above fourth embodiment and is further provided with a flow sensor 37 upstream of the anode 3 in the fuel supply unit 27 and a control unit 39. The flow sensor 37 detects a flow rate of the fuel supplied to the anode 3, and the control unit 39 is configured to receive a signal from the flow sensor 37 so as to control the regulating valve 35 and the pump 13.

The control unit 39 compares the signal from the flow sensor 37 with predetermined tolerance values. When the signal goes beyond the tolerance upper value, the control unit 39 controls the regulating valve 35 to be widened and/or attenuates the pump 13 so as to decrease the positive pressure in the mixing buffer tank 23. Thereby the flow rate is decrease to be within the tolerance values. On the contrary, when the signal goes below the tolerance lower value, the control unit 39 controls the regulating valve 35 to be narrowed and/or accelerates the pump 13 so as to increase the positive pressure in the mixing buffer tank 23. Thereby the flow rate is increased to be within the tolerance values.

According to the present embodiment, the flow rate of the fuel can be effectively and automatically controlled by means of the flow sensor 37 and the control unit 39.

In the above description, the flow sensor 37 and the control unit 39 are combined with the fuel cell system of the fourth embodiment, however, they can be combined with the fuel cell system of any embodiments from the first to the third embodiments. In such cases, similar effects can be obtained.

Figure 8:
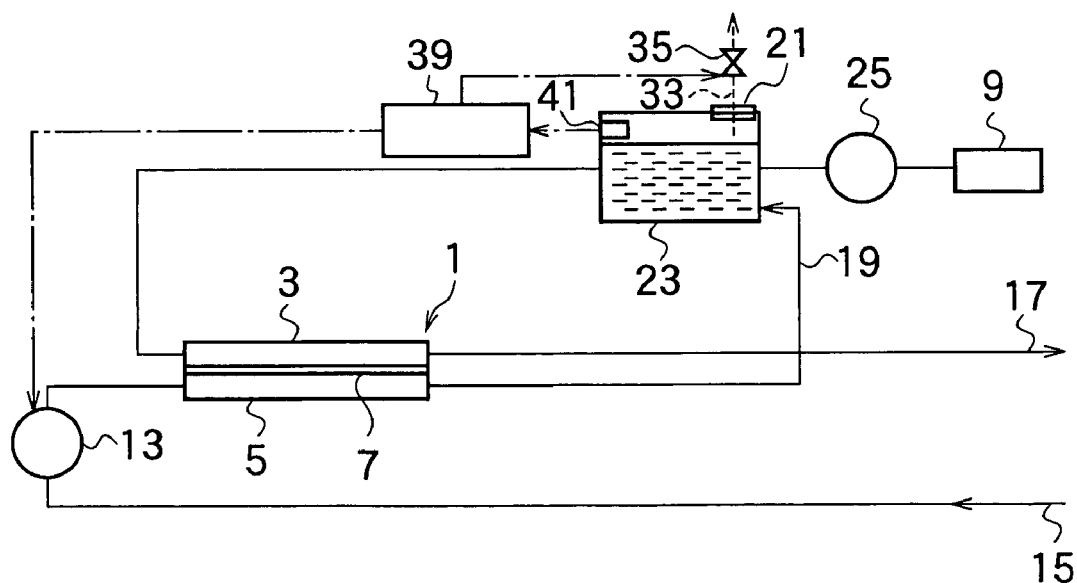
FIG. 8 is a schematic drawing of a fuel cell system according to a sixth embodiment of the present invention.

A sixth embodiment of the present invention will be described hereinafter with reference to FIG. 8. In the following description, the same elements as any of the above first to fifth embodiments are referenced with the same numerals and the detailed descriptions are omitted. Mainly differences are described below.

Though the fuel cell system of the present embodiment has a similar constitution as the above fifth embodiment, a pressure sensor 41 is provided instead of the flow sensor 37. The pressure sensor 41 detects an internal pressure of the mixing buffer tank 23 and sends a signal accompanying therewith to the control unit 39.

The control unit 39 compares the signal from the pressure sensor 41 with predetermined tolerance values. When the signal goes beyond the tolerance upper value, the control unit 39 controls the regulating valve 35 to be widened and/or attenuates the pump 13 so as to decrease the internal pressure in the mixing buffer tank 23. Thereby the internal pressure is decrease so that a flow rate of the fuel is decreased. On the contrary, when the signal goes below the tolerance lower value, the control unit 39 controls the regulating valve 35 to be narrowed and/or accelerates the pump 13 so as to increase the internal pressure in the mixing buffer tank 23. Thereby the internal pressure is increased to be within the tolerance values so that the flow rate of the fuel is increased.

According to the present embodiment, the flow rate of the fuel can be effectively and automatically controlled by means of the pressure sensor 41 and the control unit 39 similarly to the above fifth embodiment.

As in the case with the above fifth embodiment, the pressure sensor 41 and the control unit 39 can be combined with the fuel cell system of any embodiments from the first to the third embodiments. In such cases, similar effects can be obtained.

Figure 9:
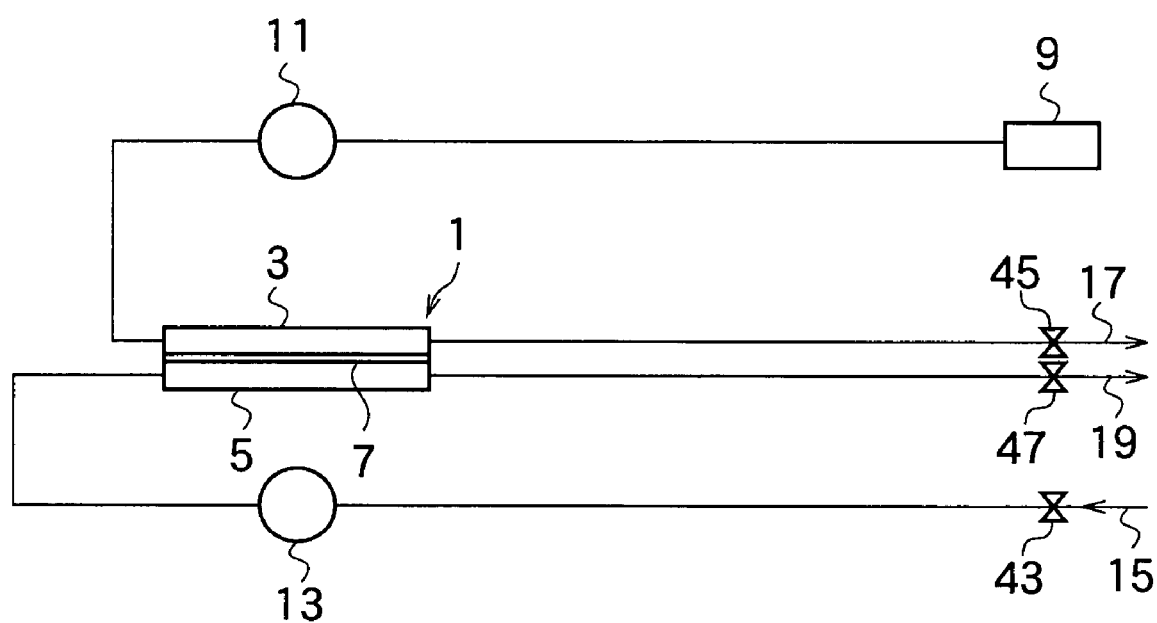
FIG. 9 is a schematic drawing of a fuel cell system according to a seventh embodiment of the present invention.

A seventh embodiment of the present invention will be described hereinafter with reference to FIG. 9. In the following description, the same elements as any of the above first to sixth embodiments are referenced with the same numerals and the detailed descriptions are omitted. Mainly differences are described below.

Concerning with the pumps 11 and 13, the fuel cell 1 and the fuel supply unit 9, the fuel cell system of the present invention has the same constitution as the prior art, however, is further provided with a switching valve 43 on the air inflow path 15 and switching valves 45 and 47 respectively on the exhaust flow paths 17 and 19. The switching valves 43, 45 and 47 are switched between an open state and a close state along with a power switch of the fuel cell system. When the fuel cell system is switched off, the switching valves 43, 45 and 47 are simultaneously shut off.

The respective flow paths 15, 17 and 19 of the fuel cell system are shut off along with the power switch so that the liquid therein is prevented from leakage. Because the power switch of the fuel cell is switched off in a case of carrying an electric device to which the fuel cell system is installed, the electric device can be safely carried without liquid leakage from the fuel cell system.

The constitution can be further applied to any embodiments from the first to the sixth embodiments instead of the present embodiment. In the cases, the same effect can be obtained as well as the respective embodiments.

For example, a case where the switching valves 43, 45 and 47 are applied to the fuel cell system of the sixth embodiment is exemplified and an operation procedure will be described hereinafter with reference to FIG. 10.

Figure 10:
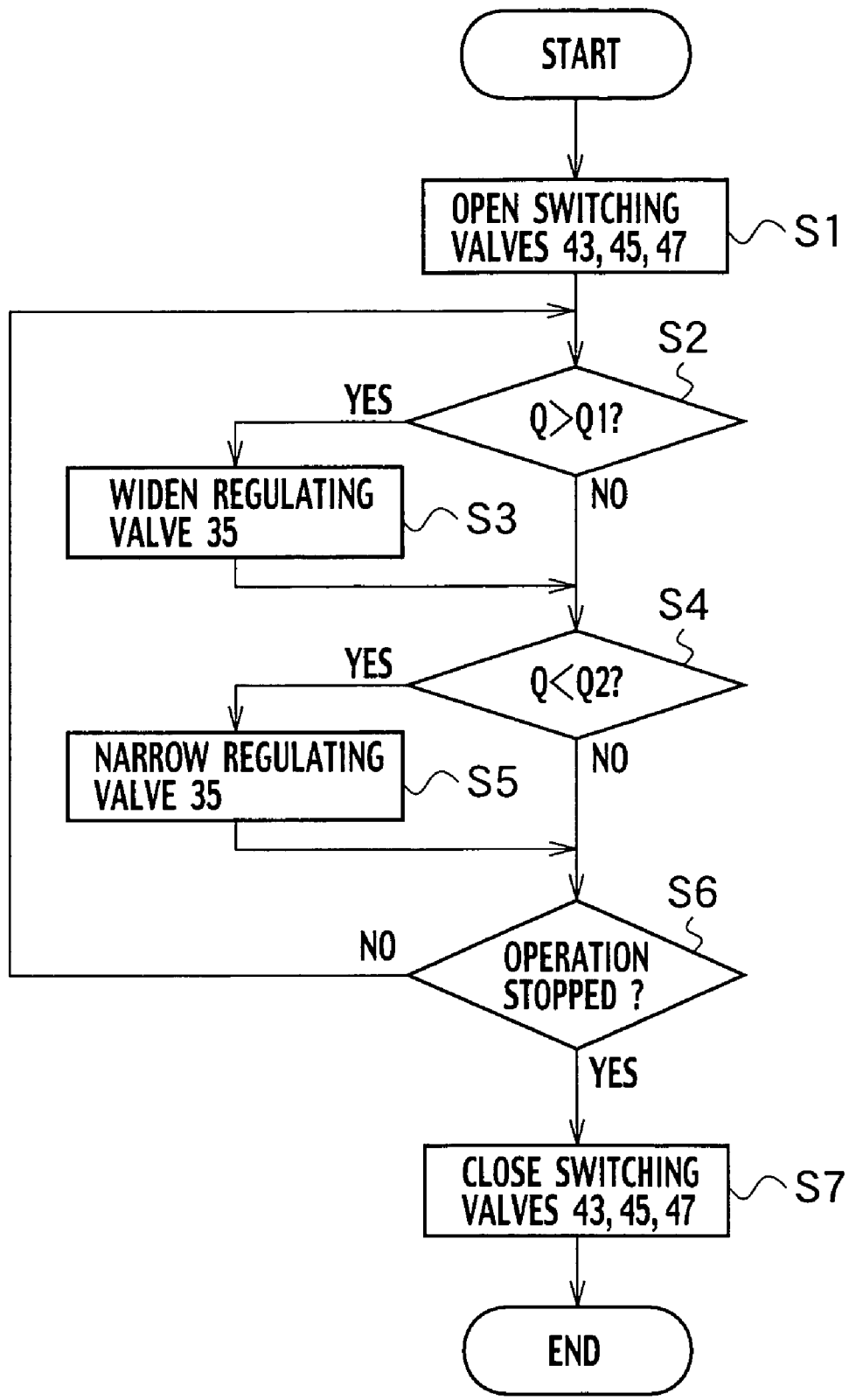
FIG. 10 is a flow chart of a control of valves.

When an operation of the fuel cell system is started, first, the switching valves 43, 45 and 47 are opened as a step S1 shown in FIG. 10. Next, in a step S2, a detected value Q of the flow sensor 37 is compared with a tolerance upper value Q1, which is predetermined. In a case where the value Q is larger than the tolerance upper value Q1, a step S3 is carried out, in which the regulating valve 35 is regulated to be widened, and the operation moves on to a next step S4. In a case where the value Q is not larger than the tolerance upper value Q1, the operation directly moves on to the step S4.

In the step S4, the detected value Q of the flow sensor 37 is compared with a tolerance lower value Q2, which is also predetermined. In a case where the value Q is smaller than the tolerance lower value Q2, a step S5 is carried out, in which the regulating valve 35 is regulated to be narrowed, and the operation moves on to a next step S6. In a case where the value Q is not smaller than the tolerance lower value Q2, the operation directly moves on to the step S6.

In the step S6, it is determined whether the operation should be stopped. In a case of continuing the operation, the operation moves back to the step S2. In the case, the flow rate Q of the fuel is kept within the tolerance values Q1 and Q2. In a case of stopping the operation, a step S7 is carried out, in which the switching valves 43, 45 and 47 are simultaneously closed.

More specifically, the flow rate Q of the fuel is regularly kept within the tolerance values in a course of the operation thereof and the flow paths 15, 17 and 19 are closed so as to prevent liquid leakage just after the operation is stopped.

Though the above embodiments are individually described for ease of explanation by reference to certain embodiments which respectively include the minimized constitutions in order to embody the present invention, the constitutions of the embodiments can be appropriately combined as occasion demands. For example, both the flow sensor 37 of the fifth embodiment and the pressure sensor 41 of the sixth embodiment are applied to the fuel cell system at the same time.

Figure 11:
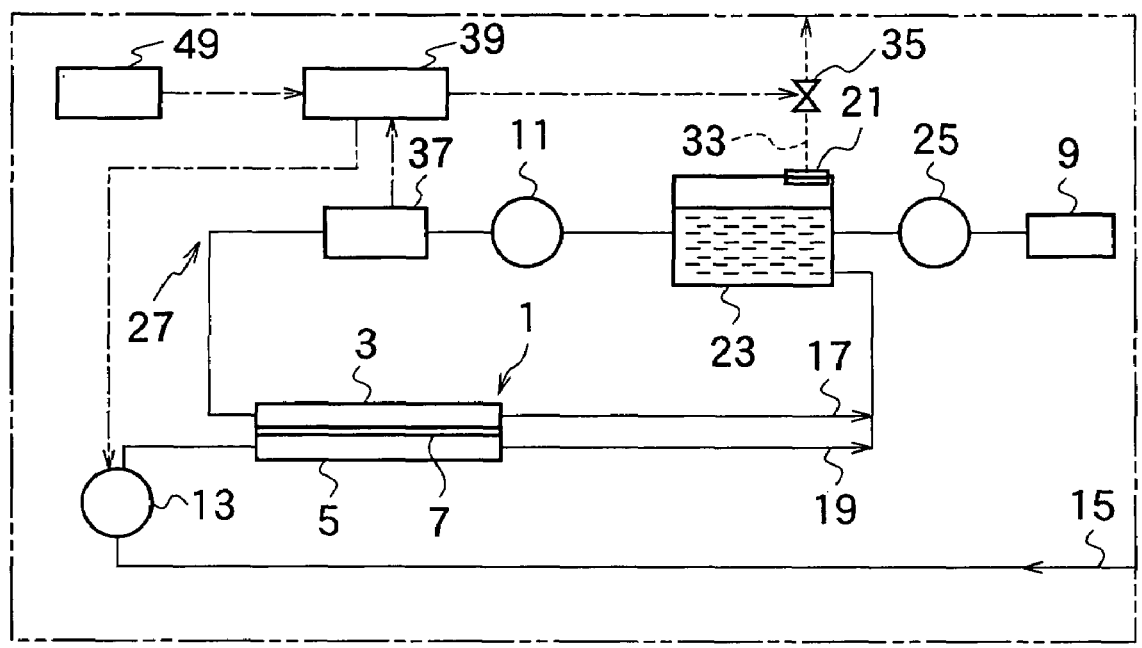
FIG. 11 is a schematic drawing of a fuel cell system according to an eighth embodiment of the present invention.

FIG. 11 shows an eighth embodiment, which is an example of the combined embodiments.

In the eighth embodiment, in a case where the flow sensor 37 detects shortage of the fuel flow rate, the control unit 39 controls the regulating valve 35 to be temporarily narrowed so as to increase the internal pressure of the mixing buffer tank 23, thereby the fuel supply from the mixing buffer tank 23 to the pump 11 is accelerated.

The fuel cell system can be directly response to an accidental case, where the fuel flow rate is decreased because of internal dry-up or mixing of a bubble into the fuel, so as to prevent shortage of the fuel.

The control unit 39 can further control the regulating valve 35 to be shut so as to prevent leakage of the fuel out of the fuel cell system. Such control effectively assures safety if the fuel cell system is tilted. To achieve such control, the fuel cell system allows to be provided with a tilt sensor 49. By means of them, the fuel cell system can be safely carried.

Although the invention has been described above by reference to certain embodiments of the invention, the invention is not limited to the embodiments described above. Modifications and variations of the embodiments described above will occur to those skilled in the art, in light of the above teachings.

What is claimed is:

1. A fuel cell system comprising:
    a fuel cell having an anode, a cathode and an electrolyte film put therebetween;
    a fuel supply unit that includes a tank and that supplies liquid fuel to the anode;
    an exhaust flow path communicating with both the anode and the cathode; and
    a gas supply unit including a pump, the pump being linked with the exhaust flow path to apply negative pressure to the cathode so as to introduce gas containing oxidant to the cathode,
    wherein the pump applies negative pressure further to the anode via the exhaust flow path so as to supply the liquid fuel to the anode, and
    wherein the pump is further connected to the fuel supply unit so as to give positive pressure to the tank and to supply the liquid fuel to the anode.

2. A fuel cell system comprising:
    a fuel cell having an anode, a cathode and an electrolyte film put therebetween;
    a fuel supply unit that includes a tank and that supplies liquid fuel to the anode; and
    a gas supply unit including a pump including a suction port and a pressure port, the suction port being linked with the cathode and the anode so as to apply negative pressure to both the cathode and the anode,
    wherein the pump is further connected to the fuel supply unit so as to give positive pressure to the tank and to supply the liqiuid fuel to the anode.

3. The fuel cell system of claim 2, wherein the pressure port is linked with the fuel supply unit so as to apply positive pressure to the fuel supply unit and to supply fuel to the anode.

4. The fuel cell system of claim 2, wherein the fuel supply unit supplies fuel to the anode without an additional pump.

* * * * *